United States Patent
Ho et al.

(10) Patent No.: US 9,876,576 B2
(45) Date of Patent: Jan. 23, 2018

(54) LAYERED COAXIAL TRANSMITTER OPTICAL SUBASSEMBLIES WITH SUPPORT BRIDGE THEREBETWEEN

(71) Applicant: Applied Optoelectronics, Inc., Sugar Land, TX (US)

(72) Inventors: I-Lung Ho, Sugar Land, TX (US); Chong Wang, Stafford, TX (US); Jianhong Luo, Ningbo (CN); Che-Shou Yeh, New Taipei (TW)

(73) Assignee: Applied Optoelectronics, Inc., Sugar Land, TX (US)

( * ) Notice: Subject to any disclaimer, the term of this patent is extended or adjusted under 35 U.S.C. 154(b) by 132 days.

(21) Appl. No.: 15/073,360

(22) Filed: Mar. 17, 2016

(65) Prior Publication Data
US 2017/0272169 A1   Sep. 21, 2017

(51) Int. Cl.
*H04B 10/40*   (2013.01)
*H04B 10/50*   (2013.01)
*G02B 6/42*   (2006.01)
*G02B 6/43*   (2006.01)
(Continued)

(52) U.S. Cl.
CPC ........... *H04B 10/40* (2013.01); *G02B 6/2746* (2013.01); *G02B 6/2938* (2013.01); *G02B 6/4245* (2013.01); *G02B 6/4257* (2013.01); *G02B 6/4263* (2013.01); *G02B 6/4272* (2013.01); *G02B 6/4284* (2013.01); *G02B 6/43* (2013.01);
(Continued)

(58) Field of Classification Search
None
See application file for complete search history.

(56) References Cited

U.S. PATENT DOCUMENTS

| 4,786,132 A | 11/1988 | Gordon |
| 5,042,898 A | 8/1991 | Morey et al. |
| 5,499,256 A | 3/1996 | Bischel et al. |

(Continued)

FOREIGN PATENT DOCUMENTS

| JP | 2000174397 A | 6/2000 |
| KR | 20000049869 A | 8/2000 |

(Continued)

OTHER PUBLICATIONS

PCT International Search Report and Written Opinion dated Oct. 22, 2012 received in related PCT Application No. PCT/US2012/046912, 8 pgs.

(Continued)

*Primary Examiner* — Michelle R Connelly
(74) *Attorney, Agent, or Firm* — Grossman Tucker Perreault & Pfleger, PLLC; Norman S. Kinsella

(57) ABSTRACT

Layered coaxial transmitter optical subassemblies (TOSAs) with a support bridge therebetween may be used in an optical transmitter or transceiver for transmitting optical signals at multiple channel wavelengths. The coaxial TOSAs may include cuboid type TO laser packages having substantially flat outer surfaces that may be mounted on substantially flat outer surfaces on a transmitter or transceiver housing or on the support bridge. The support bridge supports and isolates one layer of the TOSAs mounted over another layer of the TOSAs such that the TOSAs may be stacked to fit within a small space without sacrificing optical coupling efficiency.

20 Claims, 5 Drawing Sheets

(51) Int. Cl.
*G02B 6/27* (2006.01)
*G02B 6/293* (2006.01)

(52) U.S. Cl.
CPC ......... *H04B 10/503* (2013.01); *H04B 10/506* (2013.01)

(56) References Cited

U.S. PATENT DOCUMENTS

| | | |
|---|---|---|
| 5,729,563 A | 3/1998 | Wang et al. |
| 5,732,102 A | 3/1998 | Bouadma |
| 5,757,828 A | 5/1998 | Ouchi |
| 5,937,120 A | 8/1999 | Higashi |
| 5,987,200 A | 11/1999 | Fleming et al. |
| 6,111,999 A | 8/2000 | Espindola et al. |
| 6,118,562 A | 9/2000 | Lee et al. |
| 6,188,705 B1 | 2/2001 | Krainak et al. |
| 6,275,629 B1 | 8/2001 | Eggleton et al. |
| 6,303,040 B1 | 10/2001 | Oh et al. |
| 6,411,746 B1 | 6/2002 | Chamberlain et al. |
| 6,480,513 B1 | 11/2002 | Kapany et al. |
| 6,348,358 B1 | 12/2002 | Sousa et al. |
| 6,683,895 B2 | 1/2004 | Pilgrim et al. |
| 6,741,629 B1 | 5/2004 | Garnache et al. |
| 6,853,671 B2 | 2/2005 | Liu et al. |
| 6,917,636 B2 | 7/2005 | Blauvelt et al. |
| 6,920,159 B2 | 7/2005 | Sidorin et al. |
| 6,974,260 B2 | 12/2005 | Scheibenreif et al. |
| 7,027,469 B2 | 4/2006 | Sidorin et al. |
| 7,899,105 B1 | 3/2011 | Hargis et al. |
| 7,965,949 B1 | 6/2011 | Wach |
| 9,614,620 B2* | 4/2017 | Ho .................. H04B 10/40 |
| 9,759,877 B2* | 9/2017 | Nagarajan .............. H04B 10/40 |
| 2001/0017960 A1 | 8/2001 | Terahara |
| 2002/0131122 A1 | 9/2002 | Anderl et al. |
| 2006/0215713 A1 | 9/2006 | Flanders et al. |
| 2007/0133647 A1 | 6/2007 | Daiber |
| 2007/0223552 A1 | 9/2007 | Muendel et al. |
| 2008/0259972 A1 | 10/2008 | Heanue et al. |
| 2008/0267246 A1 | 10/2008 | Volodin et al. |
| 2009/0185586 A1 | 7/2009 | Jhung et al. |
| 2010/0208756 A1 | 8/2010 | Noh |
| 2010/0232458 A1 | 9/2010 | Kim et al. |
| 2010/0266283 A1 | 10/2010 | Beckett |
| 2011/0058771 A1 | 3/2011 | Lee et al. |
| 2011/0135309 A1 | 6/2011 | Lee et al. |
| 2012/0039572 A1 | 2/2012 | Amirkiai et al. |
| 2012/0093184 A1 | 4/2012 | Krishnamoorthy et al. |
| 2012/0189323 A1 | 7/2012 | Xu et al. |
| 2015/0253520 A1* | 9/2015 | Huang .................. G02B 6/4206 385/90 |
| 2015/0256259 A1* | 9/2015 | Huang .................. G01J 1/0271 398/88 |
| 2015/0256261 A1* | 9/2015 | Ho .......................... G02B 6/43 398/139 |
| 2016/0216466 A1* | 7/2016 | Tang .................... G02B 6/4292 |
| 2017/0059796 A1* | 3/2017 | Huang .................. G02B 6/4251 |
| 2017/0090132 A1* | 3/2017 | Nagarajan ............ G02B 6/4246 |
| 2017/0269311 A1* | 9/2017 | Wang .................. G02B 6/4208 |
| 2017/0269315 A1* | 9/2017 | Yeh ...................... G02B 6/4292 |

FOREIGN PATENT DOCUMENTS

| | | |
|---|---|---|
| KR | 20000051030 A | 8/2000 |
| WO | 03012936 A2 | 2/2003 |

OTHER PUBLICATIONS

PCT International Search Report and Written Opinion dated May 23, 2014 received in related PCT Application No. PCT/US2014/014607, 11 pgs.

Lee, San-Liang et al., "Trend and Applications of Tunable Semiconductor Lasers", Optoelectronic Materials and Devices II, Proc. of SPIE vol. 6782, 67821H, 2007, Taipei, Taiwan R.O.C., 10 pgs.

Palmer, Christopher, "Diffraction Gratings—The Crucial Dispersive Component", The Baseline, reprinted from Spectroscopy, vol. 10, No. 2, Feb. 1995, pp. 14-15.

* cited by examiner

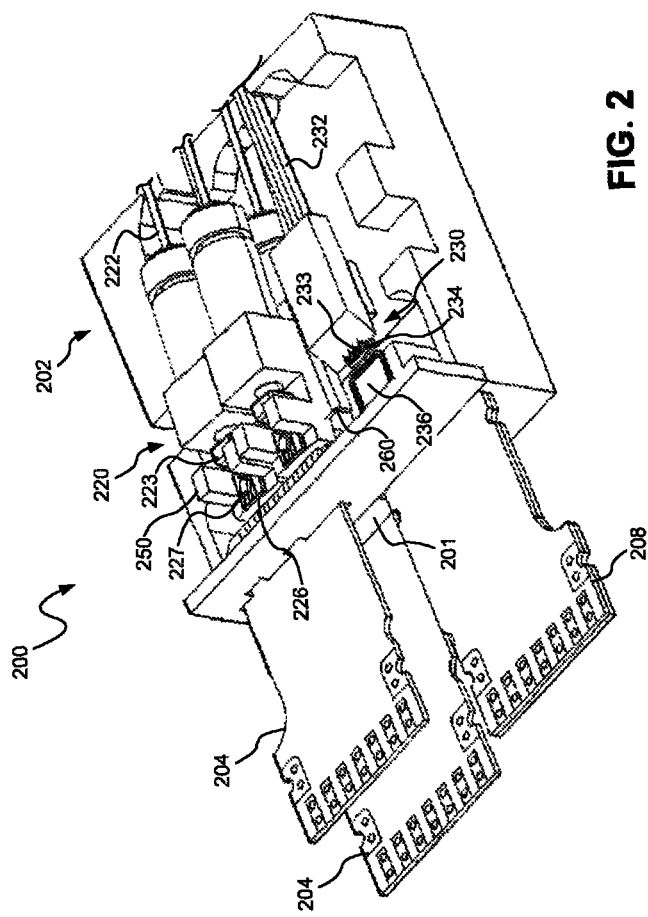

LAYERED COAXIAL TRANSMITTER OPTICAL SUBASSEMBLIES WITH SUPPORT BRIDGE THEREBETWEEN

CROSS-REFERENCE TO RELATED APPLICATIONS

The present application is related to of U.S. patent application Ser. No. 13/760,533 filed Feb. 6, 2013, which is fully incorporated herein by reference.

TECHNICAL FIELD

The present disclosure relates to optical transmitters and transceivers and more particularly, to layered coaxial transmitter optical subassemblies (TOSAs) with a support bridge therebetween.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to thermal management, insertion loss, and manufacturing yield.

Optical transceiver modules generally include one or more laser diode packages for housing a laser diode and for providing electrical connections and optical couplings to the laser diode. One challenge with optical transceiver modules is providing both a desired optical coupling efficiency as well as thermal management within a relatively small form factor. In some cases, arranging the laser diode packages within the transceiver housing to reduce space and improve thermal management may result in a reduction of coupling efficiency.

BRIEF DESCRIPTION OF THE DRAWINGS

These and other features and advantages will be better understood by reading the following detailed description, taken together with the drawings wherein:

FIG. 2 is a perspective view of layered coaxial TOSAs with a bridge therebetween in an optical transceiver module, consistent with an embodiment of the present disclosure.

DETAILED DESCRIPTION

Layered coaxial transmitter optical subassemblies (TOSAs) with a support bridge therebetween, consistent with embodiments of the present disclosure, may be used in an optical transmitter or transceiver for transmitting optical signals at multiple channel wavelengths. The coaxial TOSAs may include cuboid type TO laser packages having substantially flat outer surfaces that may be mounted on substantially flat outer surfaces on a transmitter or transceiver housing or on the support bridge. The support bridge supports and isolates one layer of the TOSAs mounted over another layer of the TOSAs such that the TOSAs may be stacked to fit within a small space without sacrificing optical coupling efficiency.

As used herein, "cuboid type TO package" refers to a laser package structure having a generally cuboid or parallelepiped outer shape formed by at least three substantially flat and orthogonal outer surfaces. For clarification, the term "TO" or "transistor outline" is derived from a reference to the traditional cylindrical package or "can" that historically encased a transistor, but as used herein, is otherwise unrelated to such transistor package. As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid.

As used herein, "mounted" refers to physically attaching two structures together, for example, using an epoxy or other substance or device for attachment. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

As used herein, "thermally coupled" refers to a direct or indirect connection or contact between two components resulting in heat being conducted from one component to the other component and "thermally isolated" refers to an arrangement where heat is prevented from being conducted to the isolated component from an external environment. In a thermally isolated multi-channel TOSA, for example, heat external to the TOSA is prevented from being conducted to one or more components in the TOSA. As used herein, "thermally shielded" refers to an arrangement that prevents heat from being transferred by convection or radiation to the shielded component. Thermally isolated and thermally shielded do not necessarily require an arrangement to prevent all heat from being conducted or transferred.

Figure 1A:
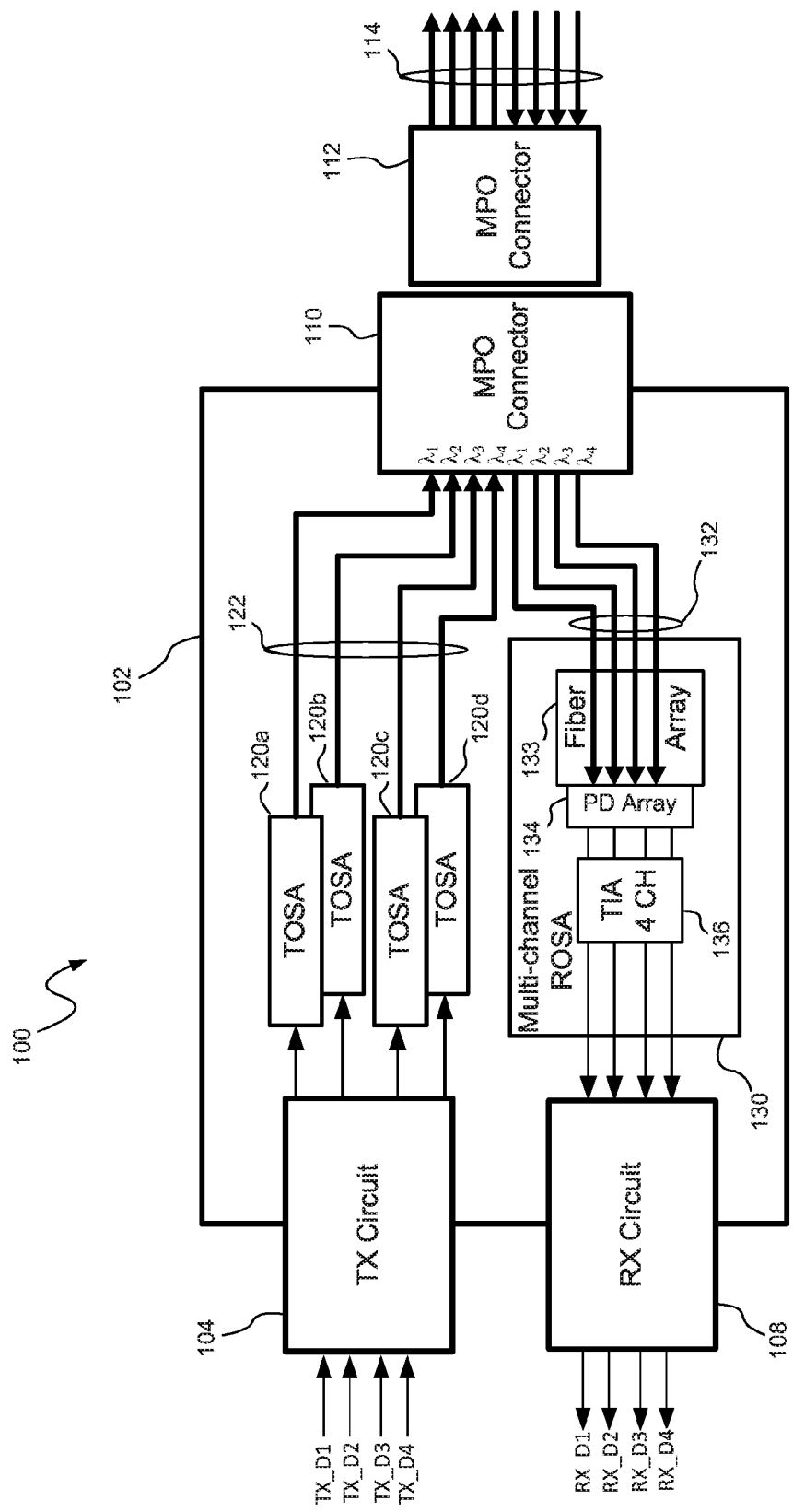
FIGS. 1A and 1B are functional block diagrams of multiple channel optical transceivers, consistent with embodiments of the present disclosure.

Referring to FIG. 1A, an optical transceiver 100, consistent with embodiments of the present disclosure, is shown and described. In this embodiment, the optical transceiver 100 transmits and receives four (4) channels using four different channel wavelengths ($\lambda_1$, $\lambda_2$, $\lambda_3$, $\lambda_4$) and may be capable of transmission rates of at least about 10 Gbps per channel. In one example, the channel wavelengths $\lambda_1$, $\lambda_2$, $\lambda_3$, $\lambda_4$ may be 1270 nm, 1290 nm, 1080 nm, and 1330 nm, respectively. The optical transceiver 100 may also be capable of transmission distances of 2 km to at least about 10 km. The optical transceiver 100 may be used, for example, in internet data center applications or fiber to the home (FTTH) applications.

This embodiment of the optical transceiver 100 includes multiple transmitter optical subassemblies (TOSAs) 120a-d for transmitting optical signals on different channel wavelengths and a multi-channel receiver optical subassembly (ROSA) 130 for receiving optical signals on different channel wavelengths. The TOSAs 120a-d and the multi-channel ROSA 130 are located in a transceiver housing 102. A transmit connecting circuit 104 and a receive connecting circuit 108 provide electrical connections to the TOSAs 120a-d and the multi-channel ROSA 130, respectively, within the housing 102. The transmit connecting circuit 104 is electrically connected to the electronic components (e.g., the laser, monitor photodiode, etc.) in each of the TOSAs 120a-d and the receive connecting circuit 108 is electrically connected to the electronic components (e.g., the photodiodes, the TIA, etc.) in the multi-channel ROSA 130. The transmit connecting circuit 104 and the receive connecting circuit 108 include at least conductive paths to provide electrical connections and may also include additional circuitry.

A multi-fiber push on (MPO) connector 110 provides optical connections to the TOSAs 120a-d and the multi-channel ROSA 130 within the housing 102. The MPO connector 110 is optically coupled to the TOSAs 120a-d and the multi-channel ROSA 130 via transmit optical fibers 122 and receive optical fibers 132, respectively. The MPO connector 110 is configured to be coupled to a mating MPO connector 112 such that the optical fibers 122, 132 in the optical transceiver 100 are optically coupled to external optical fibers 114.

Each of the TOSAs 120a-d may be a coaxial TOSA with a coaxial configuration electrically connected at one end to conductive paths on the transmit connecting circuit 104 and optically coupled at the other end to a respective one of the optical fibers 122. Each of the TOSAs 120a-d may include a laser for generating laser light at the assigned channel wavelength and optics for coupling the laser light into the respective optical fiber 122. The lasers in the TOSAs 120a-d thus convert electrical data signals (TX_D1 to TX_D4) received via the transmit connecting circuit 104 into modulated optical signals transmitted over transmit optical fibers 122. The lasers may include, for example, distributed feedback (DFB) lasers with diffraction gratings. Each of the TOSAs 120a-d may also include a monitor photodiode for monitoring the light emitted by the lasers. Each of the TOSAs 120a-d may further include one or more temperature control devices, such as a resistive heater and/or a thermoelectric cooler (TEC), for controlling a temperature of the lasers, for example, to control or stabilize the laser wavelengths.

The multi-channel ROSA 130 includes a photodetector array 134 including, for example, photodiodes optically coupled to a fiber array 133 formed by the ends of the receive optical fibers 132. The multi-channel ROSA 130 also includes a multi-channel transimpedance amplifier 136 electrically connected to the photodetector array 134. The photodetector array 134 and the transimpedance amplifier 136 detect and convert optical signals received from the fiber array 133 into electrical data signals (RX_D1 to RX_D4) that are output via the receive connecting circuit 108.

This embodiment of the optical transceiver 100 does not include an optical multiplexer or demultiplexer. The optical signals may be multiplexed and demultiplexed external to the optical transceiver 100.

Figure 1B:
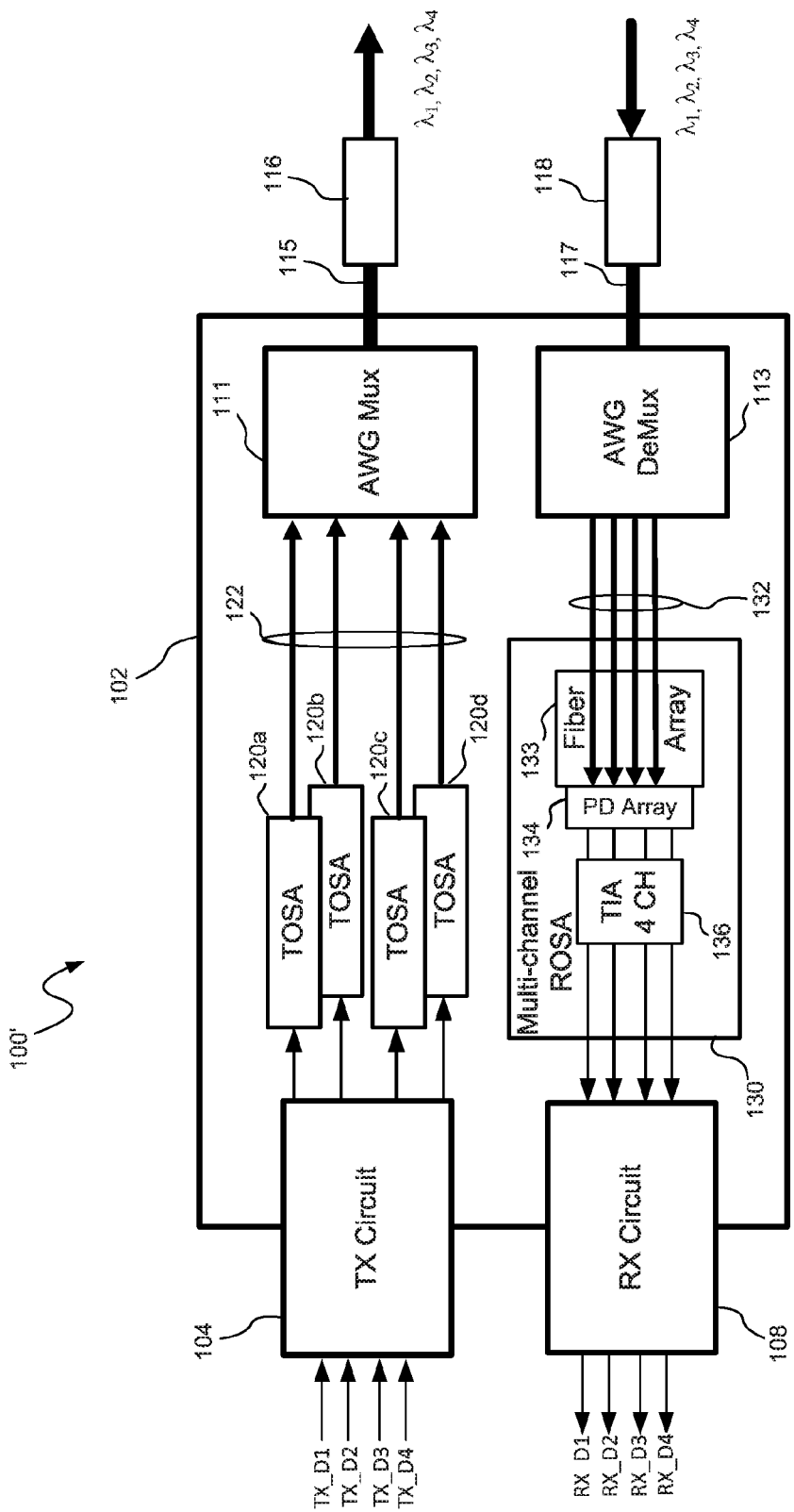

Referring to FIG. 1B, another embodiment of an optical transceiver 100' includes the same light engine (e.g., TOSAs 120a-d and ROSA 130) described above together with an optical multiplexer 111 and an optical demultiplexer 113. The optical multiplexer 111 and the optical demultiplexer 113 both may include arrayed waveguide gratings (AWGs). The optical multiplexer 111 is optically coupled to the transmit optical fibers 122 and the optical demultiplexer 113 is optically coupled to the receive optical fibers 132. The optical multiplexer 111 multiplexes the optical signals being transmitted over transmit optical fibers 122 to provide a multiplexed optical signal on an output optical fiber 115. The optical demultiplexer 113 demultiplexes a multiplexed optical signal received on an input optical fiber 117 to provide received optical signals on receive optical fibers 132. The output optical fiber 115 and the input optical fiber 117 are coupled to an output optical connector 116 and an input optical connector 118, respectively.

This embodiment of the optical transceiver 100' includes 4 channels and may be configured for coarse wavelength division multiplexing (CWDM), although other numbers of channels are possible. This embodiment of the optical transceiver 100' may also be capable of transmission rates of at least about 10 Gbps per channel and transmission distances of 2 km to at least about 10 km and may be used in internet data center applications or fiber to the home (FTTH) applications.

Although one example of the multi-channel ROSA 130 is described, the optical transceivers 100, 100' may include other types or embodiments of ROSAs. In either of the embodiments of the optical transceiver 100, 100', the TOSAs 120a-d may be stacked in layers with a support bridge between the layers of TOSAs, as described in greater detail below.

Referring to FIG. 2, an embodiment of an optical transceiver module 200 including layers of TOSAs with a support bridge therebetween is described and shown in greater detail. The optical transceiver module 200 may be designed to have a relatively small form factor with minimal space. According to this embodiment, the optical transceiver module 200 includes a transceiver housing 202, four coaxial TOSAs 220 stacked together in one region of the housing 202, and a multi-channel ROSA 230 located in another region of the housing 202. The coaxial TOSAs 220 are electrically connected to transmit flexible printed circuits (FPCs) 204 at one end of the housing 202 and optically coupled to transmit optical fibers 222 at the other end of the housing 202. The transmit optical fibers 222 may be coupled to an MPO connector or to an optical multiplexer, for example, as described above. The multi-channel ROSA 230 is electrically connected to a receive flexible printed circuit (FPC) 208 at one end of the housing 202 and optically coupled to receive optical fibers 232 at the other end of the housing 202. The receive optical fibers 232 may be coupled to an MPO connector or to an optical demultiplexer, for example, as described above.

In the illustrated embodiment, the coaxial TOSAs 220 are stacked in first and second layers within the housing 202 (only the second/top layer is shown). A support bridge 260 is positioned between the first and second layers of the coaxial TOSAs 220. Thus, the first/bottom layer of coaxial TOSAs 220 (below the support bridge 260) is mounted to a base 201 of the housing 202 and the second/top layer of coaxial TOSAs 220 is mounted to the support bridge 260, as will be described in greater detail below. Although four coaxial TOSAs are shown stacked in two layers with one support bridge, other numbers of TOSAs, layers and support bridges are possible and within the scope of the present disclosure.

Each of the coaxial TOSAs 220 includes a cuboid type TO laser package 250 that contains a laser submount 226, a diode laser 227 on the submount 226, and a lens 223. The laser submount 226 electrically connects the diode laser 227 to the respective transmit FPC 204, for example, using wire bonding. The lens 223 optically couples the laser 227 to the respective transmit optical fiber 222. The cuboid type TO laser package 250 has a generally cuboid or parallelepiped outer shape to provide heat dissipation and/or thermal shielding, as will be described in greater detail below. Each of the coaxial TOSAs 220 has a coaxial configuration such that electrical connections are made from one end of the TOSA 220 and an optical coupling is made from the other end of the TOSA 220.

The illustrated embodiment of the multi-channel ROSA 230 includes a fiber array 233 optically coupled to a photodetector array 234 and a transimpedance amplifier (TIA) 236 electrically connected to the photodetector array 234. The end faces of the optical fibers 232 in the fiber array 233 may be angled (e.g., at 45°) such that the light is reflected from the angled face to couple with the respective photodiodes in the photodetector array 234. The TIA 236 is electrically connected to the receive FPC 208, for example, using wire bonding.

The layered coaxial TOSAs with a support bridge therebetween may also be used in other types of optical transceivers such as the multi-channel transceiver used in an optical line terminal (OLT), as described in greater detail in U.S. Patent Application Publication No. 2014/0161459, which is fully incorporated herein by reference. The layered coaxial TOSAs with a support bridge therebetween may also be used in an optical transmitter without a ROSA.

Figure 4A:
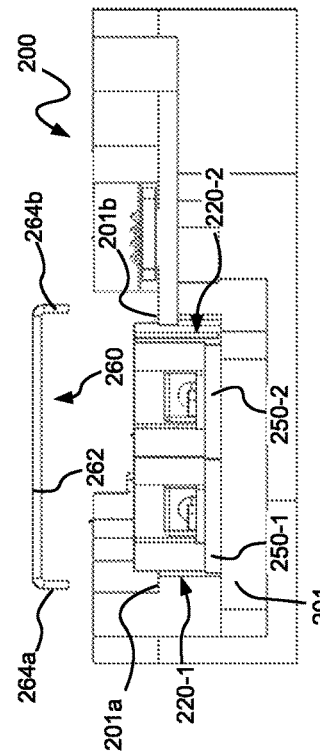
FIGS. 4A-4C are end views illustrating the placement of the bridge between first and second layers of coaxial TOSAs in the optical transceiver module shown in FIG. 2.
Figure 3A:
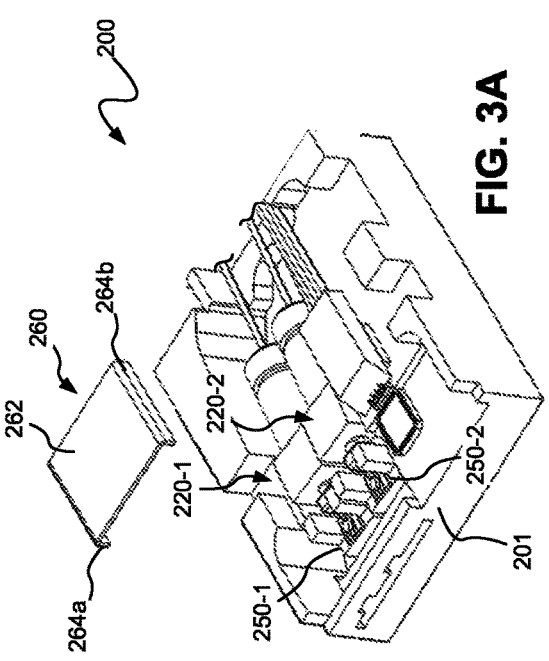
FIGS. 3A and 3B are perspective views illustrating the placement of the bridge over a first layer of coaxial TOSAs in the optical transceiver module shown in FIG. 2.

The arrangement of the layers of coaxial TOSAs 220 and the support bridge 260 is illustrated in greater detail in FIGS. 3A and 3B and FIGS. 4A-4C. As shown in FIGS. 3A and 4A, the laser packages 250-1, 250-2 of the first or bottom layer of coaxial TOSAs 220-1, 220-2 are mounted to the base 201 of the transceiver housing 202 and adjacent to each other. The laser packages 250-1, 250-2 may be mounted using an epoxy or other structure or substance capable of attachment. As shown in the illustrated embodiment, the flat side surfaces of the cuboid type TO packages 250-1, 250-2 may be in contact and thermally coupled. Thus, heat transfer may be facilitated through the cuboid type TO packages 250-1, 250-2 and into the base 201 of the housing 202.

Figure 4B:
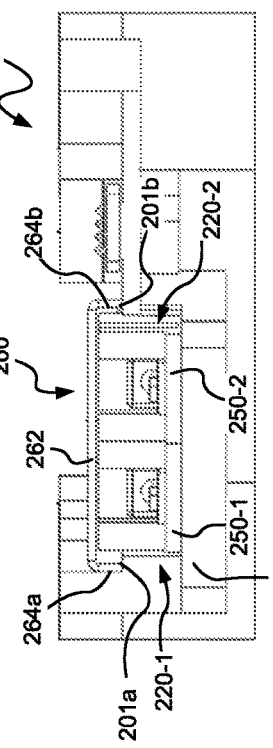
Figure 3B:
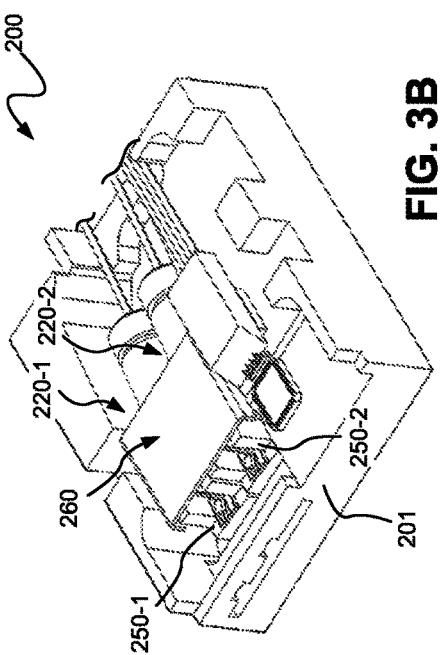

As shown in FIGS. 3B and 4B, the support bridge 260 is positioned over the laser packages 250-1, 250-2 of the first or bottom layer of coaxial TOSAs 220-1, 220-2. In the illustrated embodiment, the support bridge 260 includes a support platform 262 and legs 264a, 264b extending from sides of the support platform 262. The legs 264a, 264b contact support surfaces 201a, 201b on the housing base 201 such that the support bridge 260 extends from and is supported by the base 201. The legs 264a, 264b may be mounted to the support surfaces 201a, 201b of the base 201, for example, using epoxy. The support bridge 260 may be supported by the base 201 such that the platform 262 is spaced from the laser packages 250-1, 250-2 of the first layer of coaxial TOSAs 220-1, 220-2. The support bridge 260 may be made of a thermally conductive material such as copper or zinc with gold plating. In other embodiments, the support bridge 260 may have other configurations, for example, the support bridge 260 may include only a platform (e.g., without legs) that extends between support surfaces on the housing base 201.

Figure 4C:
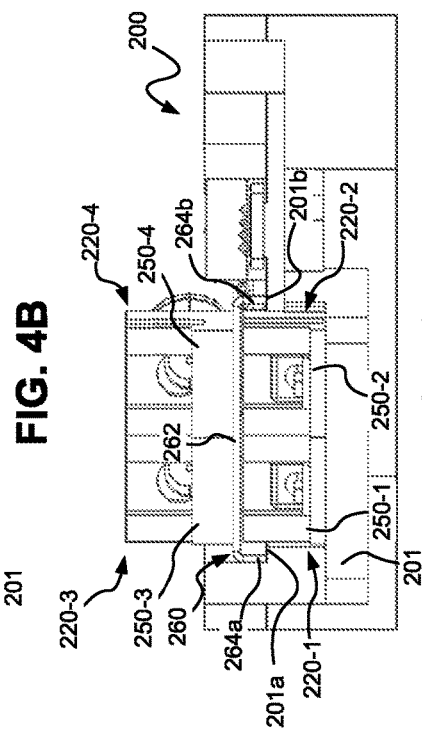

As shown in FIGS. 2 and 4C, the laser packages 250-3, 250-4 of the second or top layer of coaxial TOSAs 220-3, 220-4 are mounted on the platform 262 of the support bridge 260, for example, using an epoxy. The support bridge 260 thus supports the second layer of coaxial TOSAs 220-3, 220-4 over the first layer of coaxial TOSAs 220-1, 220-2 and prevents the second layer of coaxial TOSAs 220-3, 220-4 from contacting the first layer of coaxial TOSAs 220-1, 220-2. If the second or top layer of coaxial TOSAs 220-3, 220-4 were directly mounted on the first or bottom layer of coaxial TOSAs 220-1, 220-2, the stresses applied by the top laser packages 250-3, 250-4 on the bottom laser packages 250-1, 250-2 may reduce optical coupling efficiency and thus reduce power. For example, the coupling efficiency may vary by about ±15% in the bottom layer and ±9% in the top layer when directly coupled and may improve to about ±5% in both layers when the support bridge is used. The support bridge 260 thus supports and isolates the second layer of coaxial TOSAs 220-3, 220-4 from the first layer of coaxial TOSAs 220-1, 220-2, thereby preventing or reducing the stresses that may cause a reduction in optical coupling efficiency. The support bridge 260 also provides better thermal spread by conducting heat away from the laser packages 250-3, 250-4 of the second layer of coaxial TOSAs 220-3, 220-4.

Figure 5:
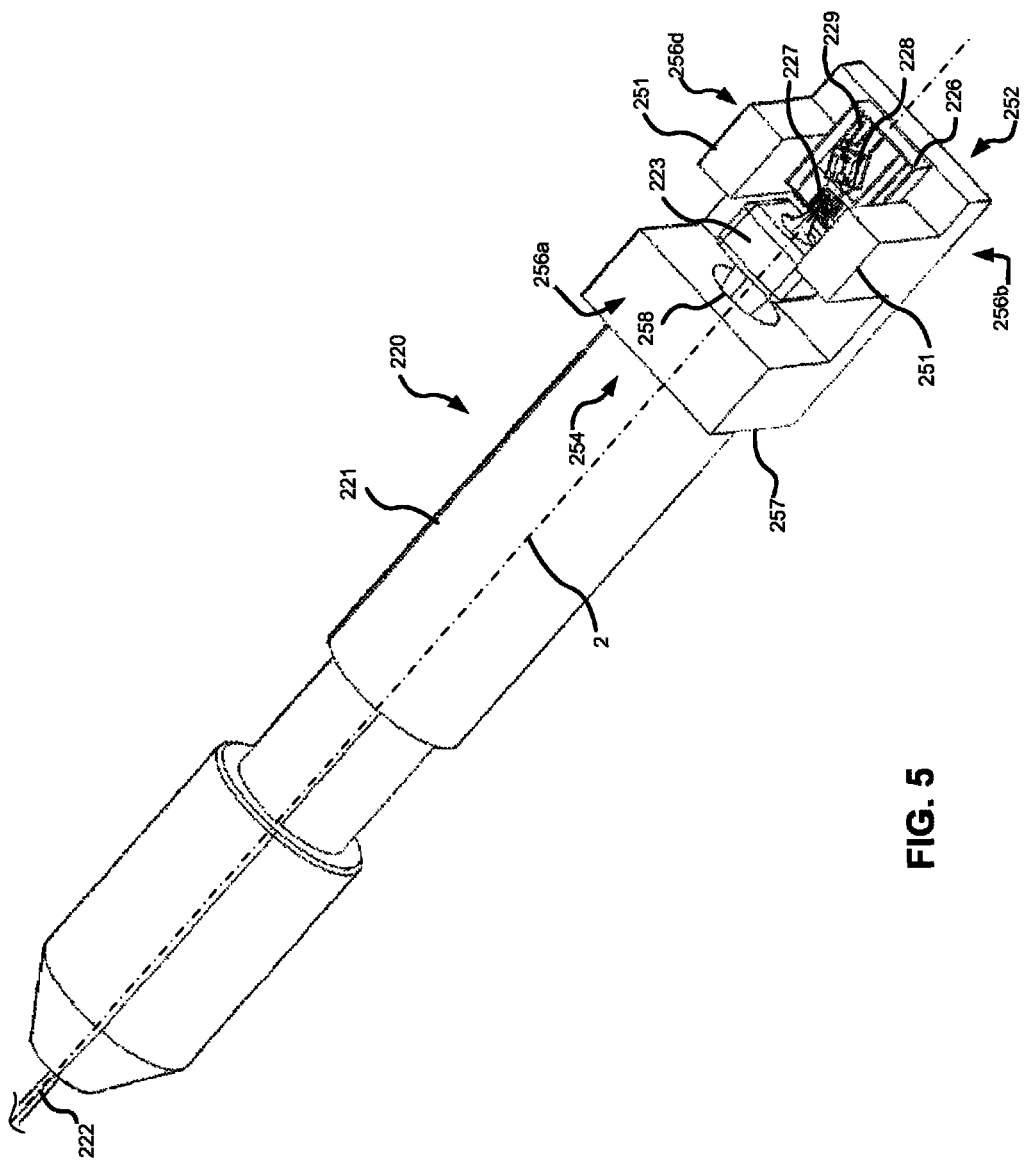
FIG. 5 is a perspective view of an embodiment of a coaxial TOSA with a cuboid type TO laser package for use in the optical transceiver module shown in FIG. 2.

As shown in greater detail in FIG. 5, each coaxial TOSA 220 includes a cuboid type TO laser package 250 that contains the laser submount 226, the diode laser 227, and the lens 223 and/or other optics. The cuboid type TO laser package 250 includes an electrical connecting end 252 opposite an optical coupling end 254. The laser submount 226 is mounted proximate the electrical connecting end 252 such that electrical leads or wires (not shown) may be electrically connected to conductive paths 229 on the submount and extend from the electrical connecting end 252. An optical coupling receptacle 221 extends from the optical coupling end 254 for optically coupling the laser 227 to the optical fiber 222. The conductive paths 229 (and electrical leads), the laser 227, the lens 223, the optical coupling receptacle 221 and the optical fiber 222 are generally aligned or positioned coaxially along a longitudinal axis 2, thereby providing the coaxial configuration of the coaxial TOSA 220.

A monitor photodiode 228 may also be mounted on the submount 226, for example, to monitor light emitted from the diode laser 227. In other embodiments, one or more temperature control devices may be provided within or on the cuboid type TO laser package 250. The temperature control devices may include a heater, such as a resistive heater, located adjacent the diode laser 227 to provide independent control of the temperature of the diode laser 227 and thus the wavelength of the emitted laser light. The cuboid type TO laser package 250 facilitates this independent temperature control of each laser 227 by preventing heat from outside of the package 250 from affecting the laser 227. Additionally or alternatively, the temperature control device may include a micro thermoelectric cooler (TEC) within the cuboid type TO laser package 250 to provide the individual and independent temperature control of the laser 227. A TEC may also be used outside of the cuboid type TO laser package 250 by thermally coupling to an outside surface of the cuboid type TO laser package 250.

The cuboid type TO laser package 250 includes at least one substantially flat outer surface substantially orthogonal to the electrical connecting end 252 and the optical coupling end 254 for contacting another substantially flat surface to facilitate heat transfer. In the illustrated embodiment, top, bottom, and side surfaces 256a-d are substantially flat, which allows multiple cuboid type TO laser packages 250 to be layered as described above. In this embodiment, the bottom surface 256b provides the greatest surface area for heat transfer.

In the illustrated embodiment, the cuboid type TO laser package 250 includes first and second side walls 251 extending from a base 253 to define a compartment 255 (see FIG. 5). The laser submount 226 is located in the compartment 255 between the side walls 251. Thus, the laser diode 227 is thermally shielded by the side walls 251. This embodiment of the cuboid type TO laser package 250 further includes an end wall 257 extending from the base 253 at the optical coupling end 254. The end wall 257 defines an aperture 258 that allows laser light to pass through for coupling into the optical fiber 222. Optics, such as an optical isolator, may also be located within the aperture 258.

The cuboid type TO laser package 250 may be formed as one piece or as multiple pieces attached together (e.g., the walls 251, 257 attached to the base 253). Although the illustrated embodiment shows the cuboid type TO laser package 250 with a particular shape, other shapes and configurations are also possible. In other embodiments, for example, the cuboid type TO laser package 250 may be closed at the top (e.g., the side opposite the base 253).

The cuboid type TO laser package 250 may be made of a thermally conductive material having a thermal conductivity greater than 60 W/(m·K) and more specifically greater than 80 W/(m·K) and, for example, about 160 W/(m·K). The cuboid type TO laser package 250 may be made, for example, from copper tungsten and may also be gold plated, for example, to facilitate soldering. In some embodiments, the cuboid type TO laser package 250 may be made from a nickel-cobalt ferrous alloy such as the type sold under the trademark KOVAR. Other thermally conductive materials may also be used.

The flat surfaces of the cuboid type TO laser package 250 advantageously provide for increased surface area contact between the package 250 and other packages, the transceiver housing and/or the support bridge. This increased surface area contact improves thermal transfer or heat conduction, and thus facilitates heat dissipation even in a smaller package design compared to traditional cylindrical type TO packages. In a conventional cylindrical type TO can package, the flat surfaces at the ends of the package cannot effectively be used for thermal transfer because it would interfere with the electrical connections and optical couplings made at these ends of the cylindrical type TO can package. The cuboid type TO package 250 provides the electrical connections and optical couplings at the ends in a coaxial configuration while also providing flat surfaces for thermal coupling and for stacking in a compact arrangement.

The cuboid type TO laser package 250 may have a relatively small size. In some embodiments, the long axis of the base 253 may be less than 3.5 mm (in the illustrated example 3.4 mm). In some embodiments, the long axis of the walls 251 and the spacing between the outside surfaces of the walls may be less than 2.5 mm (in the illustrated example 2.1 mm). Thus, the cuboid type TO laser package 250 may provide a header of about 2 mm square, which is significantly smaller than a 5.6 mm header of a conventional cylindrical type TO can package. Although the walls 251 are shown as having the same size, this is not a limitation of the present disclosure.

In another embodiment, the cuboid type TO laser package 250 may be configured to receive a ball lens, for example, as the type described in U.S. patent application Ser. No. 15/073,309, entitled COAXIAL TRANSMITTER OPTICAL SUBASSEMBLY (TOSA) INCLUDING BALL LENS, which is filed concurrently herewith and fully incorporated herein by reference.

Accordingly, a support bridge used between layers of coaxial TOSAs in a transceiver or transmitter housing, consistent with embodiments described herein, to support and isolate at least one of the layers of coaxial TOSAs to prevent stresses from reducing optical coupling efficiency and to provide improved thermal spread.

Consistent with an embodiment, optical transceiver module includes a transceiver housing including a housing base and a plurality of coaxial transmitter optical subassemblies (TOSAs) located in the transceiver housing for transmitting optical signals at different respective channel wavelengths. The plurality of coaxial TOSAs include at least first and second layers of coaxial TOSAs. A support bridge extends from the base of the transceiver housing, and the first layer of coaxial TOSAs is mounted on the housing base of the transceiver housing on one side of the support bridge. The second layer of coaxial TOSAs is mounted on the support bridge on the other side of the support bridge, and the support bridge is spaced from the first layer of coaxial TOSAs. At least one receiver optical subassembly (ROSA) is located in the transceiver housing for receiving optical signals at different channel wavelengths.

Consistent with another embodiment, optical transmitter module includes a transceiver housing including a housing base and a plurality of coaxial transmitter optical subassemblies (TOSAs) located in the transceiver housing for transmitting optical signals at different channel wavelengths. The plurality of coaxial TOSAs include at least first and second layers of coaxial TOSAs. A support bridge extends from the base of the transceiver housing, and the first layer of coaxial TOSAs is mounted on the housing base of the transceiver housing on one side of the support bridge. The second layer of coaxial TOSAs is mounted on the support bridge on the other side of the support bridge, and the support bridge is spaced from the first layer of coaxial TOSAs.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical transceiver module comprising:
   a transceiver housing including a housing base;
   a plurality of coaxial transmitter optical subassemblies (TOSAs) located in the transceiver housing for transmitting optical signals at different respective channel wavelengths, the plurality of coaxial TOSAs including at least first and second layers of coaxial TOSAs;
   a support bridge extending from the base of the transceiver housing, wherein the first layer of coaxial TOSAs is mounted on the housing base of the transceiver housing on one side of the support bridge, and wherein the second layer of coaxial TOSAs is mounted on the support bridge on the other side of the support bridge, and wherein the support bridge is spaced from the first layer of coaxial TOSAs; and
   at least one receiver optical subassembly (ROSA) located in the transceiver housing for receiving optical signals at different channel wavelengths.

2. The optical transceiver module of claim 1, wherein each of the plurality of coaxial TOSAs comprises a cuboid type TO laser package including a laser package base and at least first and second side walls extending from opposite sides of the laser package base defining a compartment, the cuboid type TO laser package having a plurality of substantially flat outer surfaces, the cuboid type TO laser package having an optical coupling end and an electrical connecting end opposite the optical coupling end, wherein the cuboid type TO laser package is made of a thermally conductive material.

3. The optical transceiver module of claim 2 wherein at least one of the substantially flat surfaces of the cuboid type TO laser packages in the first layer of coaxial TOSAs is mounted and thermally coupled to a substantially flat surface of the housing base.

4. The optical transceiver module of claim 2 wherein at least one of the substantially flat outer surfaces is orthogonal to the electrical connecting end and the optical coupling end.

5. The optical transceiver module of claim 2 wherein the cuboid type TO laser package further includes an end wall extending from the base at the optical coupling end, the end wall including an aperture configured to allow laser light to pass through.

6. The optical transceiver module of claim 5, wherein each of the plurality of coaxial TOSAs further comprises:
a laser submount mounted between the side walls in the compartment, the laser submount including conductive paths proximate the electrical connecting end for providing electrical connections;
a laser diode mounted on the laser submount and electrically connected to the conductive paths; and
optics mounted proximate the optical coupling end for optically coupling the laser through the aperture to an optical fiber.

7. The optical transceiver module of claim 6 wherein the optics include an isolator located inside the aperture and a lens aligned with the aperture.

8. The optical transceiver module of claim 1, wherein each of the plurality of coaxial TOSAs comprises:
a TO laser package including a laser package base, the TO laser package having an optical coupling end and an electrical connecting end opposite the optical coupling end;
a laser submount mounted on the laser package base, the laser submount including conductive paths proximate the electrical connecting end for providing electrical connections;
a laser diode mounted on the laser submount and electrically connected to the conductive paths; and
optics mounted proximate the optical coupling end for optically coupling the laser to an optical fiber.

9. The optical transceiver module of claim 8 wherein the laser package base has a substantially flat outer surface.

10. The optical transceiver module of claim 8 wherein a long axis of the laser package base is less than 3.5 mm and a long axis of the first and second side walls is less than 2.5 mm.

11. The optical transceiver module of claim 8 wherein the optics include a lens.

12. The optical transceiver module of claim 1 further comprising a transmit connecting circuit electrically connected to the coaxial TOSAs and a receive connecting circuit electrically connected to the ROSA.

13. The optical transceiver module of claim 1 further comprising a multi-fiber push on (MPO) connector optically coupled to the coaxial TOSAs and the ROSA.

14. The optical transceiver module of claim 1 further comprising an optical multiplexer optically coupled to the coaxial TOSAs for multiplexing the transmitted optical signals into a transmitted multiplexed optical signal and an optical demultiplexer coupled to the ROSA for demultiplexing a received multiplexed optical signal into the received optical signals.

15. The optical transceiver module of claim 1 wherein the support bridge includes a support platform and legs extending from sides of the support platform.

16. The optical transceiver module of claim 1 wherein the support bridge is made of a conductive material.

17. The optical transceiver module of claim 1 wherein the coaxial TOSAs are mounted using an epoxy.

18. The optical transceiver module of claim 1 wherein the plurality of coaxial TOSAs includes four coaxial TOSAs configured to transmit at four different channel wavelengths at transmission rates of at least about 10 Gbps per channel and transmission distances of 2 km to at least about 10 km.

19. An optical transmitter module comprising:
a transceiver housing including a housing base;
a plurality of coaxial transmitter optical subassemblies (TOSAs) located in the transceiver housing for transmitting optical signals at different channel wavelengths, the plurality of coaxial TOSAs including at least first and second layers of coaxial TOSAs; and
a support bridge extending from the base of the transceiver housing, wherein the first layer of coaxial TOSAs is mounted on the housing base of the transceiver housing on one side of the support bridge, and wherein the second layer of coaxial TOSAs is mounted on the support bridge on the other side of the support bridge, and wherein the support bridge is spaced from the first layer of coaxial TOSAs.

20. The optical transmitter module of claim 19, wherein each of the plurality of coaxial TOSAs comprises a cuboid type TO laser package including a laser package base and at least first and second side walls extending from opposite sides of the laser package base defining a compartment, the cuboid type TO laser package having a plurality of substantially flat outer surfaces, the cuboid type TO laser package having an optical coupling end and an electrical connecting end opposite the optical coupling end, wherein the cuboid type TO laser package is made of a thermally conductive material.

* * * * *